United States Patent [19]

Sanders

[11] Patent Number: 5,772,271
[45] Date of Patent: Jun. 30, 1998

[54] VERSATILE, MULTIPURPOSE TRUCK BODY

[76] Inventor: Jerome F. Sanders, 760 Mundis Mill Rd., York, Pa. 17402

[21] Appl. No.: 543,181

[22] Filed: Oct. 13, 1995

[51] Int. Cl.⁶ ................................................ B62D 33/00
[52] U.S. Cl. .......................... 296/32; 296/36; 296/37.6; 296/183; 296/184
[58] Field of Search ................................. 296/3, 10, 32, 296/36, 37.6, 50, 183, 184; D12/93, 96

[56] References Cited

U.S. PATENT DOCUMENTS

| | | | |
|---|---|---|---|
| D. 153,085 | 3/1949 | Powers | 296/183 X |
| D. 364,591 | 11/1995 | Lewellen et al. | D12/96 |
| 1,293,199 | 2/1919 | Ritcheson . | |
| 2,184,597 | 12/1939 | Iglehart | 296/50 |
| 2,324,508 | 7/1943 | Johnson | 296/36 |
| 3,068,038 | 12/1962 | Douglass, Jr. . | |
| 3,245,713 | 4/1966 | Ogilvie . | |
| 3,363,933 | 1/1968 | Wilson | 296/184 |
| 3,799,605 | 3/1974 | Silva . | |
| 3,895,842 | 7/1975 | Fair | 298/1 R |
| 3,930,680 | 1/1976 | Littlefield | 296/36 X |
| 4,423,980 | 1/1984 | Warnock | 296/37.6 X |
| 4,832,359 | 5/1989 | Rafi-Zadgh | 296/37.6 X |
| 4,906,039 | 3/1990 | Broman | 296/37.6 |
| 5,125,710 | 6/1992 | Gianglo | 296/37.6 X |
| 5,421,645 | 6/1995 | Young | 296/37.6 X |
| 5,435,627 | 7/1995 | Fleming | 298/17 R |

FOREIGN PATENT DOCUMENTS

| | | |
|---|---|---|
| 694184 | 9/1964 | Canada . |
| 926938 | 10/1947 | France . |

OTHER PUBLICATIONS

Holan, Mark C Commercial Service Body.
TruckCraft TC–300 Service Dumper (Undated Brochure).
Valley Manufacturing E–Z Utility Dumper (Undated Brochure).

*Primary Examiner*—Dennis H. Pedder
*Attorney, Agent, or Firm*—Sixbey, Friedam, Leedom & Ferguson, P.C.; Charles M. Leedom, Jr.; Joan K. Lawrence

[57] ABSTRACT

A versatile truck body for mounting on the chassis of a truck which may be adapted for multiple end uses is provided. Storage compartments formed integrally with the body floor optimize cargo volume and payload. An arrangement of fixed and removable side and rear wall panels may be configured as desired to suit the needs of the user. Optimum visibility is provided by open mesh panels aligned to extend around the perimeter of the body at an optimum visibility height from the floor. The versatile truck body of the present invention is preferably mounted on the chassis for dumping capability.

15 Claims, 2 Drawing Sheets

VERSATILE, MULTIPURPOSE TRUCK BODY

FIELD OF THE INVENTION

The present invention relates generally to truck bodies and specifically to a versatile truck body with integrally formed storage and towing capability for trucks with different size wheel bases that is readily adaptable for multiple purposes.

BACKGROUND OF THE INVENTION

Short wheel base and other wheel base trucks, in particular full-size pick-up trucks, dual wheel trucks and super duty trucks, are increasingly used for such various purposes as snow removal, towing livestock trailers, and hauling landscaping equipment and debris because the short wheel base allows easier maneuverability than a larger wheel base truck. Businesses that are seasonal in nature, such as landscaping and snow removal, are often conducted by a single entity and must use the same trucks for these disparate activities. Until the present invention, however, a single truck body with dumping capability suitable for uses as diverse as these has not been available.

The prior art has proposed a multitude of adaptations for trucks to customize them for different purposes. For example, the Knapheide Manufacturing Company of Quincy, Ill. offers numerous configurations of storage boxes, carriers and other accessories that may be mounted to the side walls and the exterior of a pick-up truck bed and body. A utility dumper may be mounted in the truck bed between the storage boxes secured to the bed. These modifications are intended to be made to a completely finished pick-up truck. H&H Equipment Company of Laotto, Ind., also offers tool boxes and similar equipment for installation on the side walls and beds of finished trucks. In addition, U.S. Pat. Nos. 3,245,713 to Ogilvie and 3,759,605 to Silva propose other modifications that can be made to pick-up trucks to increase storage capacity. These containers are also intended to be installed on a completed, walled pick-up truck bed.

Truck Craft of Greencastle, Pa., offers a truck modification that is a combination of storage and dumping capability for trucks of over 10,000 gross vehicle weight (GVW) to enhance their versatility. Although an improvement over other available designs, this arrangement does not form the storage compartments integrally with the dump body, but attaches them to the truck body. Consequently, the cargo capacity is compromised so that it is smaller than desirable.

U.S. Pat. No. 1,293,199 to Ritcheson and French Patent No. 926,938 to Lossa disclose increasing the carrying capacity of a truck by the addition of removable panels that extend beyond the height of the truck bed.

U.S. Pat. No. 5,435,627 to Fleming discloses a multipurpose adapter box for a dump truck that is designed to fit into the existing dump truck box of a dump truck so that the truck can be adapted for use in snow removable and other waste hauling activities. This adapter is designed to provide access to the interior from various locations, depending on the refuse to be hauled. There is no storage capacity provided, however.

U.S. Pat. Nos. 3,068,038 to Douglass, Jr. and 3,895,842 to Fair and Canadian Patent No. 694,184 to Douglass, Jr. are illustrative of other kinds of modifications that have been made to finished truck bodies and beds.

The prior art, therefore, has failed to provide a versatile, multipurpose truck body with dumping capability for trucks with wheel bases of different lengths that includes storage capacity formed integrally with the truck body for enhanced cargo volume in conjunction with a flexible arrangement of removable and fixed side wall panels and rear doors that allow maximum rear and side visibility for flexible access to the truck body interior and permit compatibility of the truck body with a goose-neck type of trailer hitch. A need exists for such a truck body.

SUMMARY OF THE INVENTION

It is a primary object of the present invention, therefore, to overcome the disadvantages of the prior art and to provide a versatile, multipurpose truck body with storage capacity formed integrally with the truck body and a flexible arrangement of removable and fixed side wall panels and rear doors that also has dumping capability.

It is another object of the present invention to provide a versatile truck body for trucks with wheel bases of different lengths that is adaptable for several different end uses.

It is another object of the present invention to provide a truck body with an arrangement of fixed and removable wall sections that may be configured to accommodate to support a goose-neck type of trailer hitch and trailer.

It is a further object of the present invention to provide a dump truck body that has an enhanced cargo volume and payload capability.

It is still another object of the present invention to provide a dump truck body for trucks that have expanded cabs capable of carrying several occupants besides the driver.

It is a still further object of the present invention to provide a dump truck body for a truck with integrally formed storage structures that accommodates all of the tools and equipment required for conducting a landscaping operation.

It is yet a further object of the present invention to provide a dump truck body for a truck with integrally formed storage and the support structures and auxiliary equipment required for snow removal.

The aforesaid objects are accomplished by providing a truck body to be mounted to the chassis of a truck with a passenger cab adjacent to a front axle and a frame that includes a rear axle. The body is preferably mounted rearwardly of the cab to extend over the frame and beyond the rear axle so that the body can be raised and lowered relative to the frame to facilitate dumping of the contents and emptying the body. The body has a floor with a substantially rectangular configuration and includes a fixed cab wall adjacent to the cab and opposed side walls perpendicular to the cab wall. Each side wall has a fixed section abutting the cab wall and a removable section abutting a perpendicular rear gate section. The rear gate section includes a pair of doors removably mounted to swing outwardly up to at least 270° from a fully closed position to a fully open position parallel to an adjacent side wall. The floor includes at least one storage compartment integrally formed with the floor to extend above the floor and may include at least one additional storage compartment mounted to the frame below the floor section. Access to the storage compartments is from the exterior of the truck body. The cab wall includes a cab protector extension which extends over the roof of the truck cab and a window section to allow visibility through the truck body from inside the cab. The side walls and rear gate include see-through panels which are linearly aligned with each other and with the cab wall window to provide optimum side and rear visibility.

Other objects and advantages will be apparent from the following description, claims and drawings.

DESCRIPTION OF THE PREFERRED EMBODIMENTS

The truck body of the present invention fills a need long recognized in the landscaping and grounds maintenance industry for an all-purpose, versatile truck body that is sufficiently short and compact to fit a short wheel base truck frame, but that also provides a useful and efficient quantity of cargo and storage capacity. Because the work in this industry tends to vary with the season of the year, particularly in northern climates, a single truck capable of serving the needs of any season is highly desirable. In areas where there is appreciable snow fall so that landscaping work is typically not available during the winter, many landscaping contractors undertake snow removal operations. Consequently, the present invention provides a single truck body that can be modified to meet the needs of a landscaping operation during the growing season and a snow removal operation during the winter.

Although the truck body of the present invention is designed to be installed on a short wheel base truck frame and chassis so that the truck will have the small turning radius required for snow removal operations and will still be capable of hauling loads and towing trailers, particularly those of the goose-neck variety, it may be installed on a truck frame of any desired length wheel base. The truck body of the present invention provides both optimum turning radius and payload capacity for a short wheel base truck. The dump truck body of the present invention is particularly well adapted for installation on full size pick-up trucks. Moreover, because of the compactness of the body design, the truck body of the present invention is compatible with expanded truck passenger cabs that hold more than two passengers, such as king cabs and crew cabs, as well as on dual wheel trucks and super duty trucks.

Figure 1:
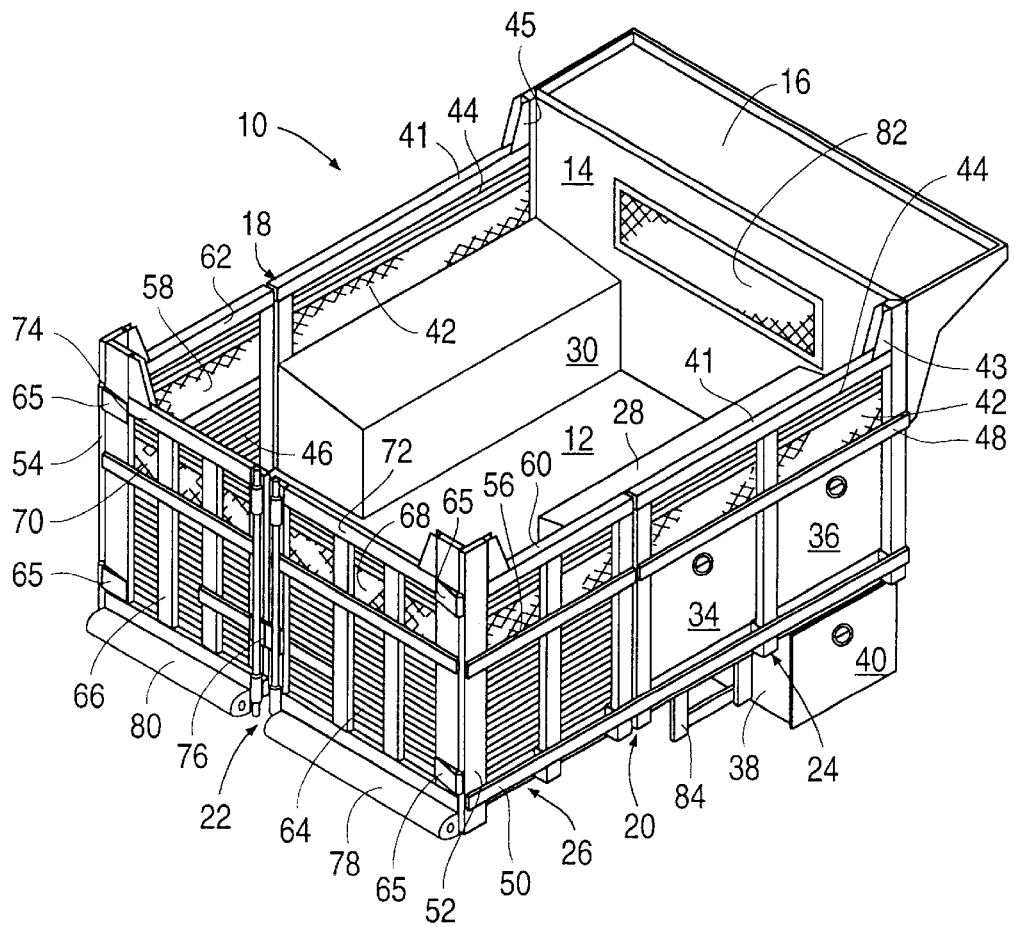
FIG. 1 is a perspective view of one embodiment of a truck body according to the present invention.
Figure 2:
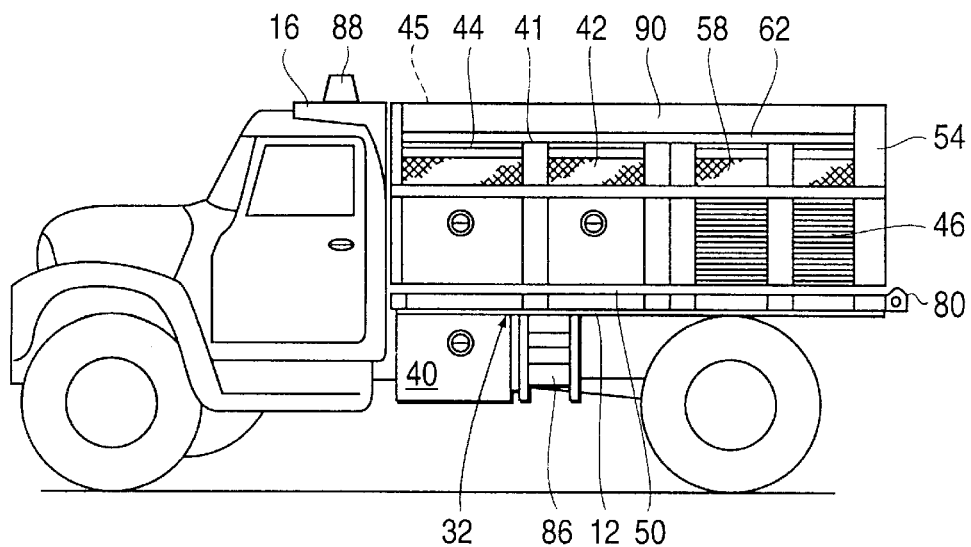
FIG. 2 is a side view of the truck body of FIG. 1 mounted on a truck chassis.

Referring to the drawings, FIG. 1 illustrates, in perspective view, one embodiment of a truck body 10 according to the present invention. FIG. 2 illustrates in side view, the truck body of the present invention mounted on a truck chassis. This truck body, which is shown apart from a truck, can be mounted on the selected truck chassis as a fixed truck body or in conjunction with a conventional dump body mounting (not shown). For maximum versatility, the dump body mounting is preferred. The truck body 10 has a substantially rectangular configuration with a floor or bed 12 which extends from the truck cab to beyond the rear axle and wheels. A cab wall 14 extends perpendicularly upwardly of the floor 12 so that it is adjacent to the cab when the truck body 10 is mounted on the chassis. The cab wall 14 includes a cab protector extension 16, which is sized to extend a selected distance over the roof of the cab to protect the cab roof from damage by yard debris or other materials carried in the truck body or by tools and the like. The cab protector extension can also serve as a shelf on which materials required for a particular job can be loaded.

The truck body 10 also includes side walls 18, 20 secured to the perimeter of the floor 12 at right angles to the cab wall 14 and a rear gate wall 22 extending between the ends of the side walls 18 and 20 opposite the cab wall 14. The truck body floor or bed 12 and walls 14, 18, 20 and 22 define a substantially rectangular box with an open top.

Side walls 18 and 20 are substantially identical in the embodiment shown in FIG. 1 to provide maximum versatility. However, they are not required to be identical, and a different arrangement from that shown could be used for each. Side wall 20 will be described in detail because the versatility and storage features of the present invention can be seen more clearly than for wall 18. Each of the side walls 18 and 20 in the FIG. 1 embodiment has a fixed section 24 and a removable section 26. The fixed section 24 is configured to provide access to at least one storage compartment 28, which has the configuration of a substantially rectangular cube with an open side positioned toward the side wall fixed section 24. A corresponding storage compartment 30 is included in the fixed wall section 32 of side wall 18. The storage compartments 28 and 30 are formed integrally with the truck body floor or bed 12. Access to each storage compartment is through hinged doors 34 and 36 located on the exterior of each side wall. Doors 34 and 36 provide access through fixed side wall section 24 through the open side of the storage compartment 28. It can be clearly seen from the drawings that the storage compartments 28 and 30 are located at and above the level of the upper surface of the floor 12. Additional storage below the upper surface of the floor 12 is provided by storage compartment 38, which has a configuration similar to compartment 28 and is accessible through door 40. Storage compartment 38 is mounted to the truck frame. Although the drawings show one particular arrangement of storage compartments, other arrangements may also be employed. For example, all of the storage may be formed on only one side of the truck body or only above the floor surface.

The fixed wall sections include removable panels 41 extending above the storage compartment doors. These panels, which are oriented horizontally and located parallel to the floor 12, include a see-through section 42, which is preferably expanded metal, and a solid section 44. When a removable panel 41 with the see-through section 42 and the solid panel section 44 is removed, which is shown and discussed in connection with FIG. 3 below, the top surfaces of the integrally formed storage compartments 28 and 30 define the upper extent of the fixed wall section 24. Tracks 43 and 45 are provided to hold the removable see-through and solid panels 42, 44 securely in place. A horizontal tie rail 48 holds the lower edge of panels 41 in place adjacent to the storage compartment doors 34 and 36.

Each side wall 18 and 20 also includes removable sections 26 and 46. A horizontal tie rail 50 positioned parallel to the edge of the floor 12 helps to hold the removable side wall section 26 temporarily in place. Removable section 26 also includes a corner support 52, which is removable with the wall section 26. A corner support 54 is similarly part of the removable side wall section 46. Each side wall removable section 26 and 46 also has a see-through panel section (56, 58) preferably made of an expanded metal, and a solid panel section (60, 62) positioned to align with the respective see-through metal panel and solid panel sections of the fixed side wall sections 24 and 32.

The rear gate wall 22 of the truck body of the present invention includes two gate sections 64 and 66 which are hinge mounted by hinges 65 on the corner supports 52 and 54, respectively. The preferred hinge type of mounting permits each gate section to swing open at least 270° so that the gate section can be secured to an adjacent side wall. This feature allows the back end of the truck body to be opened either partially or completely. Operation of the dumping capability is facilitated by this feature. In addition, each gate section is removable, which expands the hauling capability of the truck body to accommodate long loads. Each rear gate section 64, 66 has a see-through panel section (68, 70), preferably formed of an expanded metal, and a solid panel section (72, 74) positioned to align with the respective see-through panel sections and solid panel sections of each adjacent side wall. A suitable latching mechanism 76 is provided to fasten the rear gate sections together. In addition, protective bumper guards 78 and 80, which are preferably rubber or some other suitable resilient material, are provided across the bottom of each gate section. An extension (not shown) may be provided at the rear gate wall end of the floor 12 to extend beyond at least one of the gates, but not beyond the bumper. This extension allows the attachment of a piece of auxiliary equipment, such as a spreader for ice melt material or a leaf vacuum to one or both of the rear gates. This arrangement allows easy access to the truck bed through the other gate.

The cab wall 14 includes a window 82, which is preferably covered with expanded metal and is positioned to align with the expanded metal see-through panel sections in the side walls and in the rear gate wall. The see-through sections are located at a vertical distance from the floor 12 which gives the driver of the truck unobstructed side and rear visibility when the truck is not fully loaded. The height of the see-through metal panel section will be selected based on the average eye level height of the average size driver. The use of a panel of expanded metal 6 inches high positioned so that the bottom of the panel is about 20 inches above the truck floor and the top of the panel is about 26 inches above the truck floor has been found to function well for this purpose.

Mounts for a set of removable steps or a small ladder are provided on each side of the truck body to enhance the ease of access to the storage compartments and truck body interior. Only steps 84 are shown in FIG. 1; however, a similar set of steps 86 is preferably provided on the opposite side, as shown in FIG. 2. In addition, mounts for one or more sets of removable steps may be provided at the rear of the truck body and in other locations as well.

To protect the doors of the tool storage compartments, a "rub rail" (not shown) made of a resilient material like rubber which preferably extends at least 2 inches beyond the storage compartment doors may be provided along one or both tie rails 48 and 50.

The truck body of the present invention may also include various features that enhance its safe operation. For example, a strobe light 88 (FIG. 2) may be provided on the cab protector extension 16. Some governmental entities require snow removal operators to use such lights. In addition, many jurisdictions require dump trucks to provide a tarpaulin or similar covering over the load carried by an open top truck bed. Most dump trucks use a roller mounted tarpaulin that can be unrolled from the cab end to the rear end and secured to cover the truck bed contents. Such a feature could be provided with the dump truck body of the present invention.

An additional accessory useful for modifying the truck body of the present invention is a removable roof 90(FIG. 2), preferably made of aluminum, that is fitted to the truck body cab wall, side walls and rear gate wall at the level of the top edge of the solid panels (44, 60, 62, 72, 74) to form an enclosure which will accommodate and facilitate the use of a tree chipper or the like.

Figure 3:
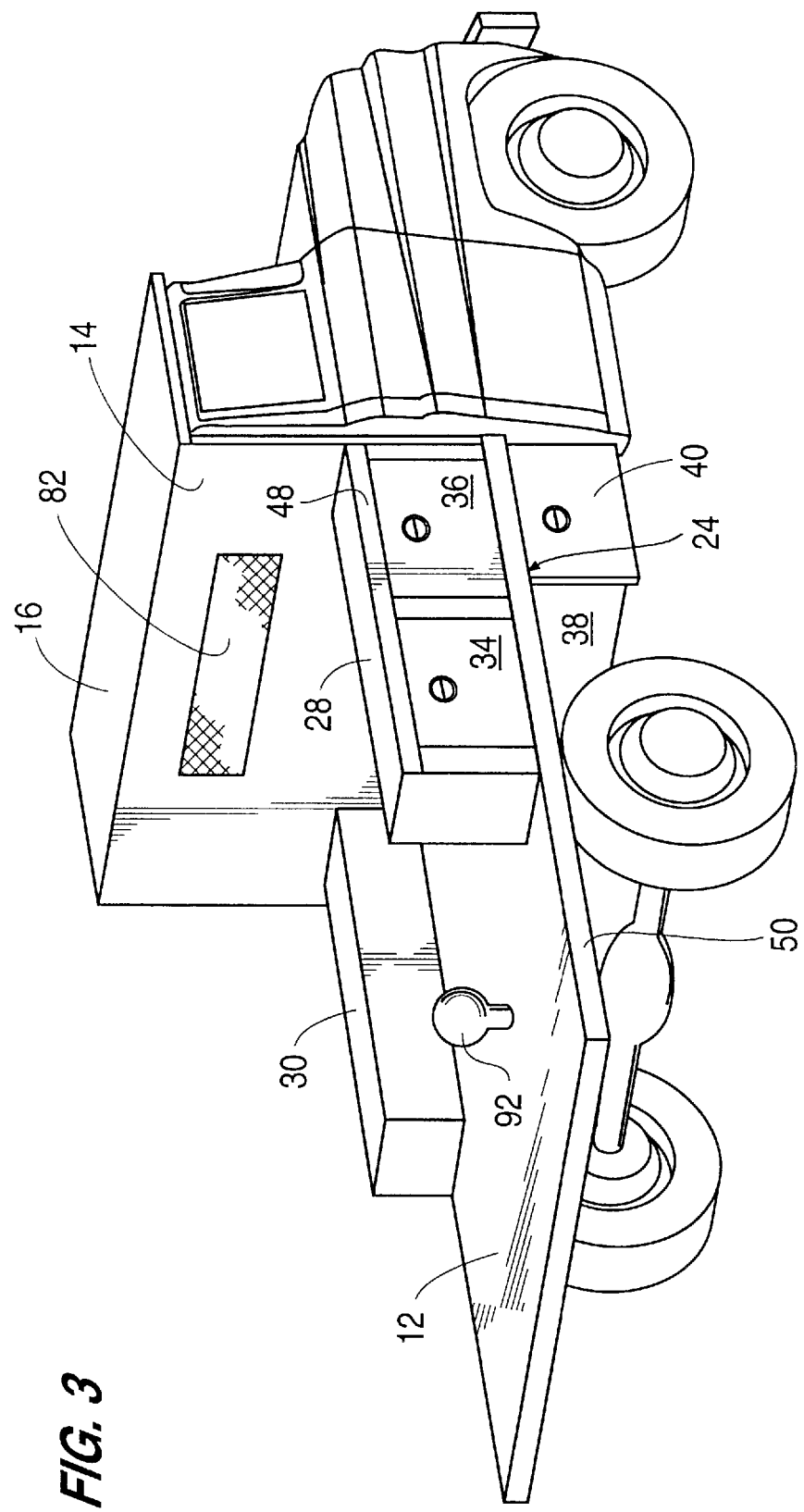
FIG. 3 is a perspective view of the truck body of the present invention adapted to receive a goose-neck type trailer hitch.

FIG. 3 illustrates the truck body of the present invention with the rear gate sections (64, 66), corner supports (52, 54) and removable side wall sections (26, 46), and the removable panels (41) of the fixed wall sections (24, 32) removed so that a trailer hitch 92 for a goose-neck type trailer can be installed and a goose-neck type of trailer can be pulled. A goose-neck type of trailer configuration will easily clear the tops of the storage compartments 28 and 30 when the truck is turned and maneuvered as required during towing operations. Access to the truck bed is also made easier, while both storage and dumping capability, if desired, are maintained. The maintenance of dumping capability, of course, requires the trailer to be disconnected.

The integral storage truck body of the present invention is preferably constructed of aluminum, although other similar materials could also be used.

Industrial Applicability

The truck body of the present invention will find its primary applicability where a versatile truck body is desired that is easily adaptable for multiple purposes and is capable of carrying a greater cargo volume and payload than existing truck models with increased accessibility, maneuverability and visibility.

I claim:

1. A versatile, multipurpose truck body with dumping capability for mounting on the chassis of a truck with a passenger cab above a front axle and a rear axle spaced behind the cab from the front axle that is easily adaptable for a variety of multiple end uses, wherein said truck body comprises:

(a) a substantially rectangular floor mounted to extend from the cab to a selected distance beyond the rear axle;

(b) a cab wall section fixedly mounted perpendicularly along the perimeter of the floor adjacent to the cab, wherein said cab wall section includes a cab protector extension mounted perpendicularly to the cab wall section parallel to the floor to extend a substantial distance over the roof of the cab and a window section positioned in said cab wall section at a location selected to provide optimum visibility from the cab;

(c) a pair of opposed side walls positioned along the perimeter of the floor perpendicular to the cab wall, wherein each said side wall includes a fixed section fixedly mounted to the floor and to the cab wall and a removable section removably mounted to the floor adjacent to the fixed section, wherein each fixed section includes a fixed portion and a removable upper panel;

(d) a rear gate wall removably mounted perpendicularly between the removable sections of each side wall to define with said floor, said cab wall section and said side walls a cargo area, wherein said rear gate wall comprises a pair of gates, each gate being hingedly mounted on a support member on an adjacent removable side wall section to pivot through an angle of at least 270° between a fully closed position perpendicular to said removable side wall section and a fully open position parallel to said removable side wall section, wherein each of said side walls and said rear gate wall includes a see-through section which extends around the perimeter of the truck body at a distance from the floor corresponding to the distance of the cab wall window from the floor to provide optimum visibility; and (e) at least one storage compartment having the configuration of a substantially rectangular solid formed integrally with the floor to extend above the floor surface into the cargo area with an open side adjacent to the fixed portion of said fixed side wall section, wherein said fixed portion includes a selected number of door panels to cover said open side and provide access to said storage compartment.

2. The truck body described in claim 1, wherein the removable upper panel of each fixed side wall section includes a see-through panel positioned substantially adjacent to the cab wall section window section.

3. The truck body described in claim 1, wherein said floor further includes mounted thereon a trailer hitch of the type suitable for connecting and supporting a goose-neck type of trailer.

4. The truck body described in claim 1, wherein said floor further includes at least one additional storage compartment mounted below the floor surface and having an open side aligned with the open side of said at least one storage compartment.

5. The truck body described in claim 1, wherein at least one ladder is removably mounted below the floor surface.

6. The truck body described in claim 1, wherein each said side wall removable section and said gate includes a solid section above and below said see-through panel.

7. The truck body described in claim 1, wherein said cab wall window section and said see-through panels are formed of an expanded metal mesh material.

8. The truck body described in claim 1, wherein said cab protector extension includes centrally mounted thereon a strobe light.

9. The truck body described in claim 1, wherein said rear gate wall includes linear strips of a resilient, shock-absorbing material positioned across said rear gate wall parallel to said floor.

10. The truck body described in claim 9, wherein a piece of auxiliary equipment is secured to the body.

11. The truck body described in claim 6, further including a removable roof section adapted to be positioned above said floor at the level of said solid sections above said see-through panels to completely enclose the interior of said truck body.

12. The truck body described in claim 1, wherein said floor, said walls and said storage compartments are formed from aluminum and said see-through panels and said window are formed from an expanded metal mesh.

13. A versatile, multipurpose truck body for mounting on the chassis of a truck with a passenger cab above a front axle and a rear axle spaced behind the cab from the front axle that is adaptable for multiple end uses, wherein said truck body comprises:

(a) a substantially rectangular floor mounted to extend from the cab to a selected distance beyond the rear axle;

(b) a cab wall section fixedly mounted perpendicularly along the perimeter of the floor adjacent to the cab, wherein said cab wall section includes a cab protector extension mounted to the cab wall section to extend a substantial distance over the roof of the cab and a window section positioned in said cab wall section at a location selected to provide optimum visibility;

(c) a pair of opposed side walls positioned along the perimeter of the floor perpendicular to the cab wall, wherein each said side wall includes a fixed section fixedly mounted to the floor and to the cab wall and a removable section removably mounted to the floor adjacent to the fixed section, wherein each fixed section includes a fixed portion and a removable upper panel;

(d) a rear gate wall removably mounted perpendicularly between the removable sections of each side wall to define with said cab wall section and said side walls a cargo area, wherein said rear gate wall comprises a pair of gates, each gate being hingedly mounted on a support member on an adjacent removable side wall section to pivot through an angle of at least 270° between a fully closed position perpendicular to said removable side wall section and a fully open position parallel to said removable side wall section, wherein each of said side walls and said rear gate wall includes a see-through section which extends around the perimeter of the truck body at a distance from the floor corresponding to the distance of the cab wall window from the floor to provide optimum visibility; and (e) at least one storage compartment having the configuration of a substantially rectangular solid formed integrally with the floor to extend above the floor surface into the cargo area with an open side adjacent to the fixed portion of said fixed side wall section, wherein said fixed portion includes a selected number of door panels to cover said open side and provide access to said storage compartment.

14. The truck body described in claim 13, wherein the removable upper panel of each fixed side wall section includes a see-through panel positioned substantially adjacent to the cab wall section window section.

15. The truck body described in claim 13, wherein said floor further includes mounted thereon a trailer hitch of the type suitable for connecting and supporting a goose-neck type of trailer.

* * * * *